United States Patent
Walker et al.

(10) Patent No.: US 8,739,293 B2
(45) Date of Patent: May 27, 2014

(54) SOCIAL AND RETAIL HOTSPOTS

(75) Inventors: Jay S. Walker, Ridgefield, CT (US);
Russell P. Sammon, San Francisco, CA (US); Renny S. Talianchich, London (GB); Jeffrey Y. Hayashida, San Francisco, CA (US); Carson C. K. Fincham, Ridgefield, CT (US)

(73) Assignee: Inventor Holdings, LLC, Stamford, CT (US)

( * ) Notice: Subject to any disclaimer, the term of this patent is extended or adjusted under 35 U.S.C. 154(b) by 509 days.

(21) Appl. No.: 12/808,199

(22) PCT Filed: Jan. 5, 2009

(86) PCT No.: PCT/US2009/030125
§ 371 (c)(1),
(2), (4) Date: Jul. 14, 2010

(87) PCT Pub. No.: WO2009/089163
PCT Pub. Date: Jul. 16, 2009

(65) Prior Publication Data
US 2010/0275267 A1    Oct. 28, 2010

Related U.S. Application Data

(60) Provisional application No. 61/019,074, filed on Jan. 4, 2008.

(51) Int. Cl.
*G06F 3/048* (2013.01)
(52) U.S. Cl.
USPC .............. 726/26; 715/778; 709/206; 194/205
(58) Field of Classification Search
USPC .............. 726/26; 715/778; 709/206; 194/205
See application file for complete search history.

(56) References Cited

U.S. PATENT DOCUMENTS

| | | | |
|---|---|---|---|
| 6,634,482 B1 | 10/2003 | Miele | |
| 6,729,461 B2 | 5/2004 | Brandle | |
| 7,383,099 B2* | 6/2008 | Pollard et al. | 700/232 |
| 2006/0095297 A1* | 5/2006 | Virik | 705/2 |
| 2007/0033607 A1 | 2/2007 | Bryan | |
| 2007/0088459 A1* | 4/2007 | Pollard et al. | 700/234 |
| 2008/0230347 A1* | 9/2008 | Hart et al. | 194/219 |

OTHER PUBLICATIONS

International Search Report for International Application No. PCT/US2009/030125 mailed Feb. 24, 2009, 3 pp.
Written Opinion for International Application No. PCT/US2009/030125 mailed Feb. 24, 2009, 5 pp.

* cited by examiner

*Primary Examiner* — Mohammad A Siddiqi
(74) *Attorney, Agent, or Firm* — Fincham Downs, LLC; Carson C. K. Fincham

(57) ABSTRACT

Systems, methods, and apparatus for social and retail hotspots are provided.

8 Claims, 7 Drawing Sheets

SOCIAL AND RETAIL HOTSPOTS

CROSS-REFERENCE TO RELATED APPLICATIONS

The present application claims priority to and the benefit of International Application No. PCT/US/09/30125, filed Jan. 5, 2009 and entitled "SOCIAL AND RETAIL HOTSPOTS", which claims priority to U.S. Provisional Patent Application No. 61/019,074, filed Jan. 4, 2008 and entitled "SOCIAL AND RETAIL HOTSPOTS". The entirety of each of the above applications is incorporated by reference herein for all purposes.

BACKGROUND

Vending machines, kiosks, Automatic Teller Machine (ATM) devices, Wi-Fi® Hotspots, gasoline pumps, and other terminals are typically utilized to provide an automated service at various and often distributed physical locations. These devices, however, do not take advantage of their existing hardware to provide other social and/or retail functionality, nor do such devices typically comprise appropriate hardware for providing many specific types of social and/or retail services or functionality.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
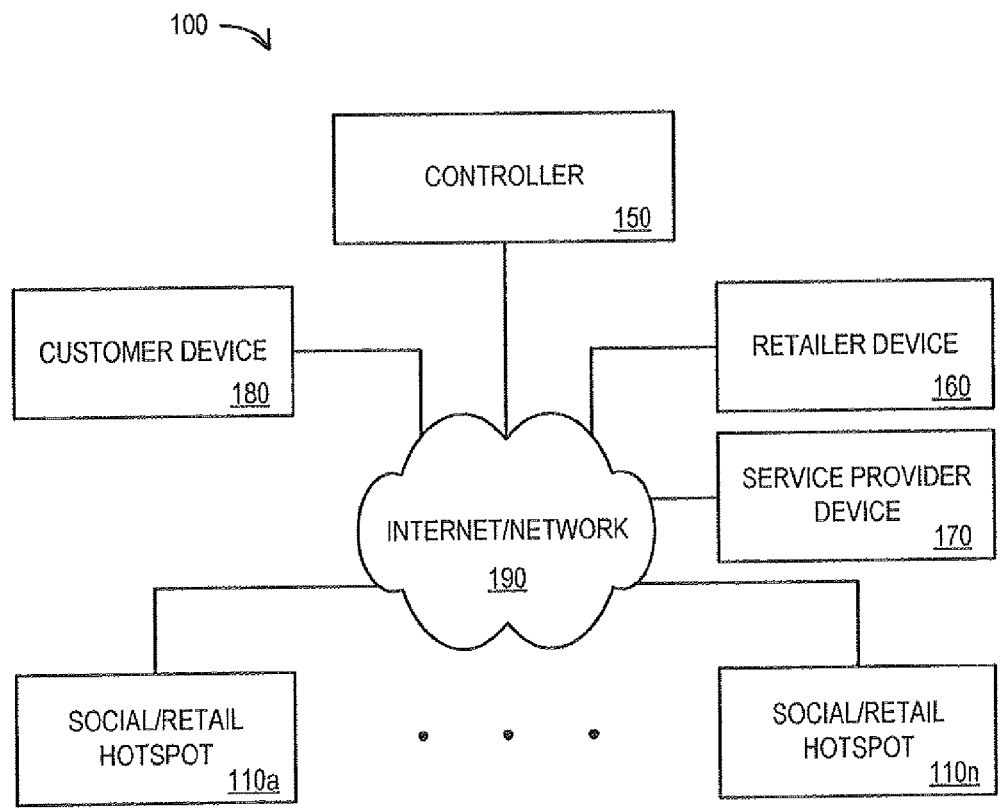
FIG. 1 is a block diagram of a system according to some embodiments.

Applicants have recognized that, in some situations, it may be advantageous to provide a "retail and/or social hotspot" to provide any or all of a myriad of services and/or functionality to consumers. A retail and social hotspot may, for example, provide an attractive, exciting, and functional location at which consumers (and/or the public generally) may meet, socialize, conduct various types of transactions, etc. In some embodiments, retail and social hotspots may provide various functionality such as (i) local shopping applications, (ii) e-commerce and/or digital retailing applications, (iii) entertainment applications, (iv) social networking applications, (v) consumer health applications, (vi) financial services applications, (vii) informational and/or connectivity applications, (viii) telecommunications applications, (ix) food service applications, (x) building and/or workplace applications, (xi) advertising and/or media platform applications, and/or (xii) personal and/or group hobby and/or collecting applications.

Such retail and social hotspots may, in some embodiments, take advantage of existing terminals and/or other devices. A retail and social hotspot may be embodied in, for example, a vending machine, an ATM, a wireless router and/or other device comprising a Wi-Fi® Hotspot, a gasoline and/or other fuel pump or dispenser, a kiosk (such as a directions-providing terminal), a coupon terminal, a water dispenser, a postal meter, a grocery scanner and/or dispenser, a health checkup machine, a Coinstar® machine, a check-cashing machine and/or consumer loan terminal, and/or any combination thereof.

In some embodiments, a social and/or retail hotspot may be embodied in a vending machine comprising a processor, a primary customer interface in communication with the processor, the primary customer interface being disposed on a primary side of the vending machine, a secondary customer interface in communication with the processor, the secondary customer interface being disposed on a secondary side of the vending machine, wherein the secondary side is different than the primary side, a sensor in communication with the processor, the sensor coupled to sense the presence of customers situated in front of the primary side of the vending machine, and a memory in communication with the processor. The memory may, for example, store instructions that when executed by the processor cause the processor to facilitate utilization of the primary customer interface by a first customer, wherein the utilization comprises a first interface session, determine, based on information received from the sensor, that a second customer is in front of the primary side of the vending machine, and switch, based on a determination that the second customer is in front of the primary side of the vending machine, the first interface session of the first customer to the secondary customer interface.

In some embodiments, a social and/or retail hotspot may be embodied in a vending machine comprising a processor, a customer interface in communication with the processor, a sensor in communication with the processor, the sensor coupled to sense the presence of people situated in one or more zones proximate to the customer interface, and a memory in communication with the processor. The memory may, for example, store instructions that when executed by the processor cause the processor to facilitate utilization of the customer interface by a customer, wherein the utilization comprises a first interface session, determine, based on information received from the sensor, that a person other than the customer has entered the one or more zones proximate to the customer interface, and alter, based on a determination that the person other than the customer has entered the one or more zones proximate to the customer interface, the first interface session in a manner selected to enhance security for the first interface session.

In some embodiments, a social and/or retail hotspot may be embodied in a vending machine comprising a coin acceptor, a coin recognition device coupled to identify a coin deposited into the coin acceptor, wherein an identification of the deposited coin comprises an identification of (i) a type of the deposited coin and (ii) a year of minting of the deposited coin, a processor in communication with the coin recognition device, a communication device in communication with the processor, and a memory in communication with the processor. The memory may, for example, store instructions that when executed by the processor cause the processor to store, in the memory, an indication of a customer, store, in the memory, an indication of a coin desired by the customer, wherein the indication of the desired coin comprises (i) a type of the desired coin and (ii) a year of minting of the desired coin, determine, based on deposited coin identification information received from the coin recognition device and based on the stored indication of the desired coin, that the deposited coin is equivalent to the desired coin, and/or transmit, via the communication device, an electronic message to the customer, wherein the electronic message indicates that the desired coin is available at the vending machine.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments described herein are associated with a "social and retail hotspot". As used herein, the term "social and retail hotspot" may generally refer to any device, location, portal, terminal, and/or interface that provides one or more social and/or retail applications. In some embodiments, a social and retail hotspot may comprise an existing vending machine, kiosk, terminal, ATM, and/or other device that is modified and/or adapted to and/or is otherwise capable of providing the one or more social and/or retail applications.

Some embodiments described herein are associated with a "control system". As used herein, the term "control system" may generally refer to any combination of hardware, software, firmware, and/or microcode that is operative to carry out and/or facilitate embodiments described herein. For example, a control system may comprise a processor performing instructions of a program to facilitate coin collecting of registered customers. The control system may comprise, according to some embodiments, a single device and/or component or may comprise any practicable number of networked devices.

Some embodiments described herein are associated with a "network device". As used herein, the term "network device" may generally refer to any device that can communicate via a network. Examples of network devices include a PC, a workstation, a server, a printer, a scanner, a facsimile machine, a copier, a PDA, a storage device (e.g., a disk drive), a hub, a router, a switch, and a modem or a wireless phone. In some embodiments, network devices may comprise one or more network components, such as a Static Random Access Memory (SRAM) device or module, a network processor, and/or a network communication path, connection, port, or cable. Some examples of network devices may include, but are not limited to, servers or controllers, customer devises, vending machines, input devices, output devices, and peripheral devices.

As used herein, the terms "server" and "controller" may be used interchangeably and may generally refer to any device that may communicate with one or social/retail hotspots, one or more third-party servers, one or more remote controllers, one or more customer devices, one or more peripheral devices and/or other network nodes, and may be capable of relaying communications to and/or from each such device. A controller or sever may, for example, comprise one or more network devices and/or components.

As used herein, the terms "customer device" and "user device" may be used interchangeably and may generally refer to any device owned and/or operated by, or otherwise associated with a customer, which device is capable of accessing and/or outputting online and/or offline content. Customer devices may communicate with one or more servers or controllers, one or more social/retail hotspots, one or more third-party service provider servers, one or more user terminals, and/or other network devices or nodes. In some embodiments, customer devices may, for example, include gaming devices, PC devices, PDA devices, Point-Of-Sale (POS) terminals, point of display terminals, kiosks, telephones, cellular phones, Automated Teller Machines (ATM) devices, pagers, and/or combinations of such devices. In some embodiments, customer devices may communicate with vending machines and remote devices and/or computers wirelessly, through any practicable wireless communication networks, formats and/or protocols, including but not limited to those described herein.

Some embodiments described herein are associated with an "input device". As used herein, the term "input device" may generally refer to any device that is used to receive or process input. An input device may communicate with and/or be part of another device (e.g., a wagering game device). Some examples of input devices include, but are not limited to: a button, a key, one or more softkeys and/or variable function input devices, a bar-code scanner, a magnetic stripe reader, a computer keyboard, a pointing device (e.g., a computer mouse, touchpad, and/or trackball), a point-of-sale terminal keypad, a touch-screen, a microphone, an infrared sensor, a sonic ranger, a computer port, a video camera, a motion detector, an accelerometer, a thermometer, a digital camera, a network card, a Universal Serial Bus (USB) port, a Global Positioning System (GPS) receiver, a Radio Frequency IDentification (RFID) receiver, a RF receiver, a pressure sensor, and a weight scale or mass balance.

Some embodiments described herein are associated with an "output device". As used herein, the term "output device" may generally refer to a device that is used to output information. An output device may communicate with and/or be part of another device. Some examples of output devices may include, but are not limited to: a Cathode Ray Tube (CRT) monitor, a Liquid Crystal Display (LCD) screen, a Light Emitting Diode (LED) screen, a printer, an audio speaker (or other sound or noise-producing device), an Infra-red Radiation (IR) transmitter, a RF transmitter, a vibration device, an olfactory emitter, and/or a data port.

It should be understood that some devices may function and/or operate as both input and output devices. A touch-sensitive display device (or "touch screen"), for example, may both receive input by receiving pressure and/or electrostatic indications via a display screen and may also provide output such as graphics, text, and/or other data via the same display screen.

Some embodiments herein are associated with "communication". As used herein, the term "communication" may refer to any information, data, and/or signal that is provided, transmitted, received, and/or otherwise processed by an entity, and/or that is shared or exchanged between two or more people, devices, and/or other entities. Communications may be external to one or more devices, internal (e.g., within a device and/or component), wired, wireless, continuous, and/or intermittent. Communications may involve, for example, one or more of transmitting, receiving, relaying, processing, and/or otherwise interfacing with information and/or data. Some, but not all, possible communication networks that may be utilized for such communications include: a Local Area Network (LAN), a Wide Area Network (WAN), the Internet, a telephone line (e.g., a Public Switched Telephone Network (PSTN)), a cable line, a radio channel, an optical communications line, and/or a satellite communications link. A variety of communications protocols may be utilized to facilitate and/or conduct such communications, including but not limited to: Ethernet (or IEEE 802.3), Internetwork Packet Exchange IPX), Service Advertising Protocol (SAP), Asynchronous Transfer Protocol (ATP), Bluetooth®, and/or Transmission Control Protocol (TCP)/Internet Protocol (IP). Communications may be encrypted to ensure privacy and prevent fraud in any of a variety of ways that are or become known or practicable.

Devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

As used herein, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the IP Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As used herein, the term "coupled" may generally refer to any type or configuration of coupling that is or becomes known or practicable. Coupling may be descriptive, for example, of two or more objects, devices, and/or components that are communicatively coupled, mechanically coupled, electrically coupled, and/or magnetically coupled. The term "communicatively coupled" generally refers to any type or configuration of coupling that places two or more objects, devices, components, or portions, elements, or combinations thereof in communication. Mechanical, electrical, and magnetic communications are examples of such communications. The term "mechanically coupled" generally refers to any physical binding, adherence, attachment, and/or other form of physical contact between two or more objects, devices, components, or portions, elements, or combinations thereof. The term "electrically coupled" indicates that one or more objects, devices, components, or portions, elements, or combinations thereof, are in electrical contact such that an electrical signal, pulse, or current is capable of passing between the one or more objects, enabling the objects to electrically communicate with one another. The term "magnetically coupled" indicates that one or more objects, devices, components, or portions, elements, or combinations thereof, are within one or more associated magnetic fields. Objects may be electrically and/or magnetically coupled without themselves being physically attached or mechanically coupled. For example, objects may communicate electrically through various wireless forms of communication or may be within (at least partially) a magnetic field, without being physically touching or even adjacent.

III. System

Referring first to FIG. 1, a block diagram of a system 100 according to some embodiments is shown. The various systems described herein are depicted for use in explanation, but not limitation, of described embodiments. Different types, layouts, quantities, and configurations of systems described herein may be utilized without deviating from the scope of some embodiments.

While two (2) social/retail hotspots 110a, 110n are depicted in the system 100, for example, fewer or more retail/social hotspots 110 may be included without deviating from the scope of some embodiments. Similarly, while the social/retail hotspots 110a-n are depicted is being in communication with and/or coupled to a controller 150, a retailer device 160, a service provider device 170, and a customer device (such as a home computer and/or portable computing device) 180, fewer or more such devices 150, 160, 170, 180 may be in communication with and/or coupled to any or all of the social/retail hotspots 110a-n.

According to some embodiments, the social/retail hotspots 110a-n may be in communication with and/or coupled to various devices (e.g., devices 150, 160, 170, 180) via the Internet and/or network 190. The social/retail hotspots 110a-n may, for example, function as portals and/or access points via which consumers may interface with various service and/or retail providers to facilitate applications offered by the social/retail hotspots 110a-n.

Customers may utilize the social/retail hotspots 110a-n, for example, to access e-mail (e.g., via the service provider device 170 which may include an Internet Service Provider (ISP) device), conduct online banking transactions and/or inquiries (e.g., via the service provider device 170 which may include an online banking device), conduct video and/or audio conferencing with friends, family, colleagues, and/or business contacts (e.g., via the service provider device 170 which may include an Internet Service Provider (ISP) device, between two or more social/retail hotspots 110a-n, and/or between a social/retail hotspot 110a-n and a customer device 180), to purchase snacks and/or drinks, and/or to manage and/or enhance hobby and/or collecting activities.

IV. Apparatus

Figure 2:
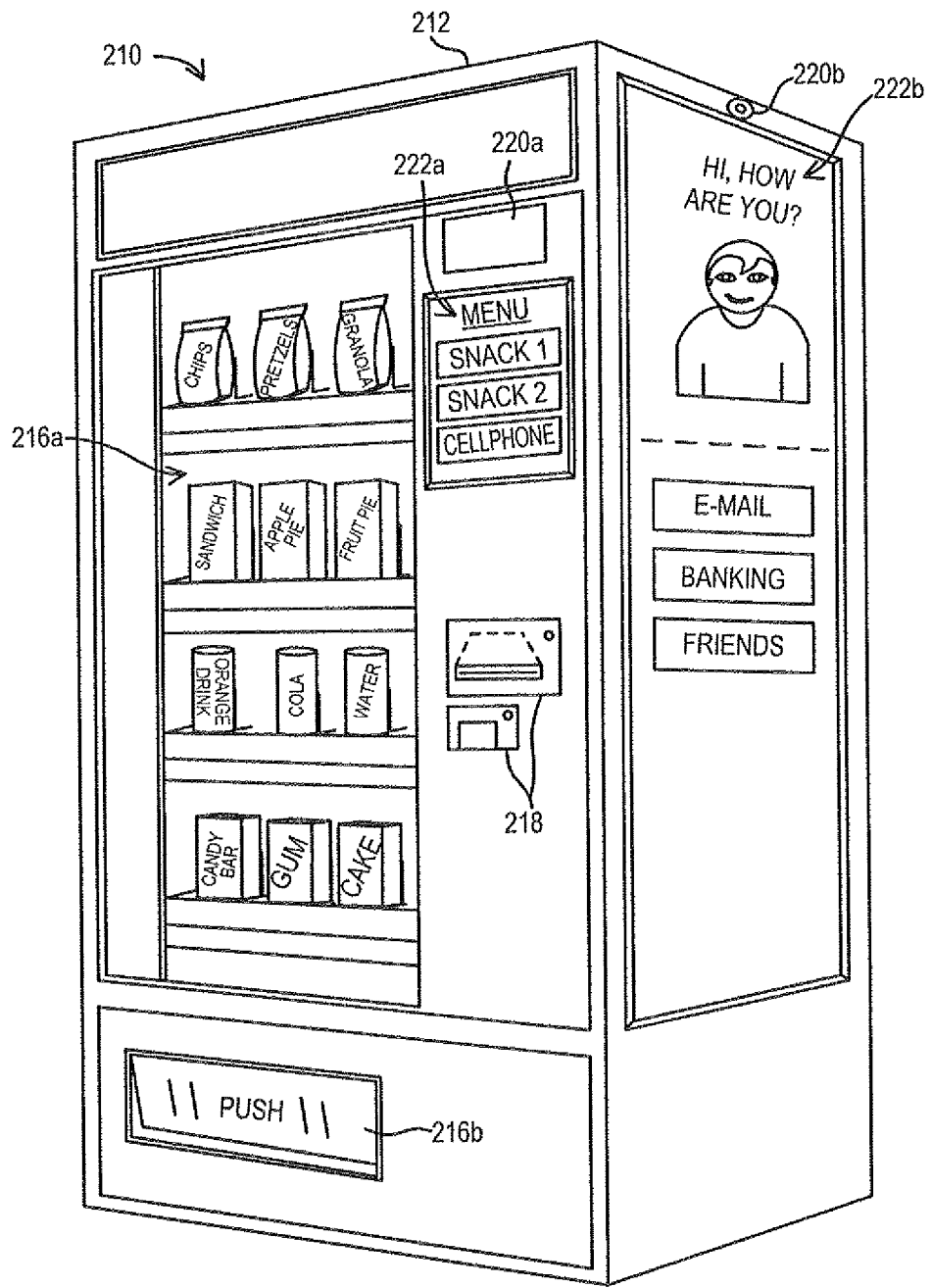
FIG. 2 is a perspective diagram of an apparatus according to some embodiments.

Turning to FIG. 2, a perspective diagram of an apparatus 210 according to some embodiments is shown. In some embodiments, the apparatus 210 may be similar in configuration and/or functionality to any of the social/retail hotspots 110a-n of FIG. 1. As shown in FIG. 2, for example, the apparatus 210 may comprise a vending machine cabinet 212 that houses several components similar to a conventional vending machine. The apparatus 210 may comprise, for example (and/or the cabinet 212 may house and/or be coupled to), a product storage and dispensing device/area 216 (such as a product storage/display area 216a and/or a product dispensing mechanism 216b), and/or payment acceptance and/or issuance devices 218 (such as a bill and/or coin validator and/or dispenser). In some embodiments the payment acceptance and/or issuance devices 218 may comprise one or more printers and/or magnetic ink printers. In some embodiments, the acceptance and/or issuance devices 218 may comprise and/or be coupled to a coin (and/or currency) identification device (not explicitly shown in FIG. 2) capable of identifying one or more of: (i) a type of coin/currency received by the apparatus 210 (e.g., a nickel, dime, quarter, Susan B. Anthony dollar coin, Presidential series dollar coin, dollar bill, and/or five dollar bill); (ii) a year of minting/printing of the coin/currency (e.g., coin minted/struck in 2005 or 1954 and/or dollar bill from 1982 series printing); (iii) a mint identification mark of the coin/currency (e.g., a "D" signifying that a coin was minted/struck at the Denver, Colo. mint); (iv) a quality of the coin/currency (e.g., clarity, magnitude of scratches, coloration/discoloration, measure of corrosion, tears or rips, permanent markings/defacement, and/or bends, folds, and/or crispness of paper currency); and/or (v) any other markings, text, figures, inscriptions, objects, and/or items of possible interest (e.g., whether an image on a coin/bill is engraved/printed in the proper orientation and/or whether specific text appears as it is supposed to—e.g., to identify potentially valuable outliers, misprints, and/or mis-minted coins/currency).

The apparatus 210 may also or alternatively comprise one or more input devices 220 (such as (a motion detector 220a and/or a camera 220b) and/or one or more output devices 222 (such as a primary display device 222a and/or a secondary display device 222b). According to some embodiments, the motion detector 220a may be utilized to determine the functionality of the primary display device 222a and/or the secondary display device 222b. A consumer may be allowed to utilize the primary display device 222a for non-retail and/or non-purchase-oriented transactions (e.g., checking e-mail), for example, until the motion detector 220a detects the presence of another consumer waiting in line to access the apparatus 210. In the case that a line is detected, the first consumer's interface session with the apparatus 210 may be switched to the secondary display device 222b to allow the waiting consumer to access the apparatus 210. In some embodiments, in the case that another consumer is detected in proximity to either display device 222a, 222b, privacy and/or security functions may be initiated to protect any operations that the first user is currently conducting. These privacy and/or security functions may increase in magnitude and/or effect depending upon the type of transaction being conducted by the first consumer and/or depending upon the detected range of another consumer and/or depending upon a number of detected other consumers. The more other consumers that are detected, for example, the higher the security and/or privacy intervention by the apparatus 210. Similarly, the closer another consumer is and/or becomes to the display device 222a, 222b that the first consumer is utilizing, the more stringent the security becomes.

The camera 220b may generally be utilized to facilitate applications such as consumer identification verification and/or such as two-way video conferencing. The camera 220b may also or alternatively be utilized to facilitate identification of customers, the detection of customers, and/or the detection and/or counting of customers proximate to the apparatus 210 and/or the various display devices 222a, 222b thereof. In some embodiments, the camera 220b may be utilized to provide image data to a program to analyze the potential security risk of actions and/or positions taken by various consumers in proximity to the apparatus 210. While security measures may not typically be warranted for a second customer standing behind a first customer in line, for example, if the camera 220b is utilized to detect that the second customer is taking a picture and/or video of the first customer's interface session with the apparatus 210, then security measures may be implemented.

In some embodiments, the primary display device 222a may be dedicated to certain functionality (such as vending locally stored products and/or other retail applications) while the secondary display device 222b may be dedicated to all other available applications (such as checking e-mail, video conferencing, etc.). In some embodiments, the primary display device 222a may be utilized to interface with the applications offered by the apparatus 210 (e.g., a social/retail hotspot). The primary display device 222a may, for example, provide a menu of services available and/or may also or alternatively allow a consumer to take advantage of any functionality inherent in any host device upon which the apparatus 210 is integrated (e.g., a vending machine such as may be the case in FIG. 2). According to some embodiments, the primary display device 222a may be disposed and/or situated on or coupled to a primary or first side or surface of the apparatus 210. As shown in FIG. 2, for example, the primary display device 222a is situated on/coupled to what would normally be considered the front of the apparatus/vending machine 210.

In some embodiments, the secondary display device 222b may also or alternatively be utilized to interface with social/retail hotspot applications. The secondary display device 222b may be much larger than the primary display device 222a, according to some embodiments, and may accordingly lend itself to being more useful for certain applications (such as video conferencing, as depicted in FIG. 2). According to some embodiments, such as shown in FIG. 2, the secondary display device 222b may be disposed and/or situated on or coupled to a secondary or second side or surface of the apparatus 210 (such as what would normally be considered a side of the apparatus/vending machine 210, as shown in FIG. 2). In some embodiments, a smaller display device 222a, 222b may be incorporated into the side of the apparatus 210, as opposed to on the front.

In some embodiments, either or both of the display devices 220a, 220b may be mounted on an arm (not shown) coupled to the apparatus 210 such that the arm may be swung between different orientations to reposition either or both of the display devices 222a, 222b. The arm, for example, may be mounted such that one or more of the display devices 222a, 222b may be repositioned from the front of the apparatus 210 to the side of the apparatus 210. In some embodiments, the arm may couple to the secondary display device 222b and may have a default orientation/position on the front of the apparatus such that the secondary display device 222b blocks and/or substantially covers the primary display device 222a. In the event that more than one consumer or customer desires to utilize the apparatus 210 (and/or is detected, such as by the motion sensor 220a and/or the camera 220b), the arm and coupled secondary display device 222b may be repositioned (such as adjacent to the primary display device 222a and/or to the side of the apparatus 210) to unblock/uncover the primary display device 222a such that both display devices 222a, 222b may be utilized at the same time (e.g., for separate customer interface sessions). In such an arrangement, it should be clear that the display device 222a, 222b coupled to the arm and/or other movable device (such as a slide or track, etc.) may be considered the primary display device 222a when situated in the primary, first, and/or default position, and may then be considered the secondary display device 222b when repositioned to the secondary, second, and/or alternate position.

Generally, a retail and social hotspot (such as the apparatus 210) may comprise a wide variety of hardware components that are operable to facilitate a plurality of social and/or retail applications. In some embodiments, different retail and social hotspots may comprise different hardware components, as is or becomes desirable and/or practicable. While only two types of input devices 220a, 220b and only two output devices 222a, 222b are depicted in FIG. 2, for example, it should be understood that fewer or more of any such devices and/or different or additional types or configurations of devices may be coupled to the apparatus 210 without deviating from the scope and intent of at least some embodiments.

Some of the hardware components that a retail and social hotspot may comprise include, but are not limited to: (i) one or more biometric devices (e.g., fingerprint, thumbprint, palm print, voice and/or voice pattern recognition, face recognition, iris and/or retina recognition, and/or finger vein scanning equipment); (ii) one or more cameras (still and/or video)—such as the camera 220b; (iii) one or more printing devices (e.g., ink, laser, and/or magnetic ink or other printers)—such as may be represented by the payment issuance device 218; (iv) one or more display devices (e.g., a primary display device and a secondary display device, a plurality of display devices of different sizes, one or more image projectors, touch screen devices, and/or wearable display devices such as glasses, hats, and/or helmets or visors incorporating one or more displays and/or virtual displays)—such as the primary display device 222a and/or the secondary display device 222b; (v) one or more health screening or checkup devices (e.g., a blood pressure monitor, a cholesterol scanner, a body fat meter, and/or a weight scale or mass balance); (vi) one or more communications devices (e.g., a telephone handset and/or dial pad, a router, a modem, and/or a video conference or calling terminal); (vii) one or more currency acceptance and/or dispensing devices; (viii) one or more motion and/or other sensors (e.g., temperature sensors, humidity sensors, moisture sensors, and/or noise sensors)—such as the motion sensor 220a; (ix) one or more other input devices (e.g., microphones, speakers, a stylus, and/or a keyboard and/or keypad—physical and/or virtual/projected); and/or (x) a coin identification device (e.g., capable of identifying coin/currency types, dates, conditions, and/or other features, such as may be beneficial for facilitating coin/currency collecting activities of customers).

V. Applications

According to some embodiments, applications available via a social/retail hotspot may include, but are not limited to:

A. Local shopping applications (e.g., integrated local grocery store bar coded coupons and promotions, mall and local shopping, survey program—answer twenty (20) questions; based on answers, get coupons—e.g., personalized);

B. E-commerce and digital retailing applications (e.g., e-commerce linked to the physical world, online ordering with one-touch payment, consumer goods, electronics, last minute overstocks and specials, travel deals, online shopping, low price search engine, auctions; linked automatic rewards system to loyalty and purchases made at other places—continuous rewards, personalized coupon dispensing);

C. Entertainment applications (e.g., video downloads, new movie clips, trailers, releases, sports, news, lottery, gaming, competitive games of skill with leader boards, tournaments and fantasy sports leagues, blogging);

D. Social Networking applications (e.g., YouTube™ clips, user-posted clips, exchange clips, e-mail, text message, dating, "I was here" messages);

E. Consumer health applications (e.g., "Revolution Health", talk to doctor/nurse for non-emergency questions);

F. Financial Services applications (e.g., integrated biometric account access with users' other online accounts, affinity credit card with built-in continuous reward system, online insurance quotes, mortgages, home equity loans, checking and savings account access, bill payment, check mortgage balance, allow phone company to remind that phone bill is due, anonymous bill payment, Western Union™—send money anywhere in world, secure authenticated transactions, ATM services, banking services, paycheck cashing, paycheck printing, personal check printing, money order printing);

G. Information/communications applications (e.g., local restaurant locator, movie theatres—buy and print tickets, local entertainment finder, web/Internet access, e-mail access, web search, free printed directions—or via e-mail, text message, telecommunications access—phone, video phone, teleconferencing, integrated mobile transactions—pay with mobile phone, Skype® and VOIP long distance calling);

H. Food Service applications (e.g., snack and beverage vending, gift cards, bulk purchases, new product introductions and launches, taste testing and product sampling, printed coupons, back end pick pack revenue management systems);

I. Building and Workplace applications (e.g., workplace electronic bulletin board, human resource incentives—recognition, free product, cash, workplace services—stay late bonuses, employee rewards, reporting problems);

J. Advertising and Media platform applications (e.g., 24-hour streaming news, sports, entertainment, health news, broadcast quality programming, interactive network—text messaging, e-mail capture); and K. Hobby and/or Collecting applications (e.g., coin/currency collecting facilitated, recipes shared and/or posted, etc.).

VI. Processes

Various embodiments will now be described with references to methods, procedures, and/or processes associated with some embodiments. The methods, procedures, and/or processes described herein may generally be performed by the system 100 of FIG. 1 and/or any of the many components and/or devices described herein (e.g., by a social/retail hotspot 110a-n, 210 of FIG. 1 and/or FIG. 2, respectively). Other configurations of systems and devices may also or alternatively be utilized to perform the methods described herein without deviating from the scope of some embodiments. The procedures described herein do not necessarily imply a fixed order to the actions, and embodiments may be performed in any order that is practicable. Note that any of the methods described herein may be performed by hardware, software (including microcode), firmware, or any combination thereof. For example, a storage medium may store thereon instructions that when executed by a machine result in performance according to any of the embodiments described herein.

Some embodiments include identifying a consumer, user, and/or other person interfacing with and/or desiring to interface with a social/retail hotspot. Identification of a user may be accomplished in many ways. In some embodiments, identification may be conducted via one or more biometric devices such as described herein. In such embodiments, identifying a user may comprise collecting and/or otherwise determining biometric information of the user (e.g., from a biometric sensor or scanner) and/or verifying such biometric information (e.g., by comparing the information to information stored in a local and/or remote database), based on user account with kiosk or user's account on second system such as by matching a user's social/retail hotspot account with the user's account on a second system (e.g., bank account, payroll, email address, cell phone number, state identification system such as driver's license number and birth date, credit card). According to some embodiments, upon identification and/or verification of an identity of the user, one or more benefits may be provided to the user. This may comprise, for example, authorizing such a benefit to be provided.

As used herein, the term "benefit" may generally include any type of benefit that is or becomes known or practicable. In some embodiments, a benefit may be considered a "host benefit", which includes a product or service provided by a device that 'hosts' the social/retail hotspot functionality. In the case that a social/retail hotspot comprises and/or is embodied in an ATM, for example, a host benefit would comprise dispensing of currency and other financial account transactions. A "portal benefit", on the other hand, comprises a product or service that is not typically available from the 'host' device. In the case that the 'host' is an ATM, for example, checking of e-mail by a user would be a portal benefit (e.g., something that the ATM would not typically be capable of allowing in the absence of the social/retail hotspot functionality).

In embodiments where the social/retail hotspot is not embodied in and/or coupled to another device (e.g., the social/retail hotspot comprises a self-sufficient and/or separate stand-alone device), all benefits provided may be considered "portal benefits".

Several advantages of having a biometric devices provided by the social/retail hotspot include: (i) the user does not need to purchase his/her own biometric device for home computer/cell phone; (ii) better quality biometric devices can be implemented than if a consumer were to purchase one for home use—which equates to better security; (iii) revenue can be generated in other ways, which helps to pay for the installation costs of biometrics and other sensors that otherwise are too expensive to deploy in a dedicated; and (iv) terminals are often located in public area, but are well-enough attended to prevent vandalism.

In some embodiments, a big screen (such as the secondary display device 222b of FIG. 2) may be used to display 3D images of products that are stocked inside and available for sale from the kiosk/vending machine. This allows, for example, for a deeper vending machine that can stock more products and/or may also allow for linked vending machines where a second machine is placed behind the first. The big screen may be Multi-Layer Display from PureDepth™ (PureDepth™ is headquartered in Redwood Shores, Calif.). In some embodiments, the big screen on front may be used for improved advertising of products inside (a commercial of a hot day and icy cold cola drink).

Auxiliary services may also or alternatively be provided to a customer using front and side screens. Examples of auxiliary services (e.g., "portal benefits") may include, but are not limited to: internet access (e.g., find directions, reading email, look for movie tickets, dinner reservations); premium media access (e.g., listening to music, watching video clips or movies); communications services (e.g., video phone, video conferencing); financial services (e.g., banking, wiring money, investing information, check cashing); health services (e.g., blood pressure, BMI, percent hydration); human resources services (e.g., forms and employee information are updateable and accessible, paychecks, employment openings); social networking (e.g., Facebook™, Myspace™, company intranet); and/or collectors services (e.g., coin collector notifications of portal inventory).

In some embodiments, customers may start out by using a front screen (e.g., the primary display device 222a of FIG. 2) on the social/retail hotspot in the case that the front screen is large or better quality (e.g., brighter, better colors, 3D display, etc.), because auxiliary services are advertised to customers on the front screen, and/or because of better peripherals associated with screen (e.g., 3D viewing glasses, surround sound speakers). If, however, a customer is monopolizing the front screen of the social/retail hotspot, then this may prevent other customers from using the social/retail hotspot (e.g., the social/retail hotspot comprises a vending machine and other customers need to used the vending machine to purchase snacks or beverages, and/or the social/retail hotspot comprises a coupon terminal and other customers need to get coupons, or the social/retail hotspot comprises an ATM and other customers need to get money).

Figure 3A:
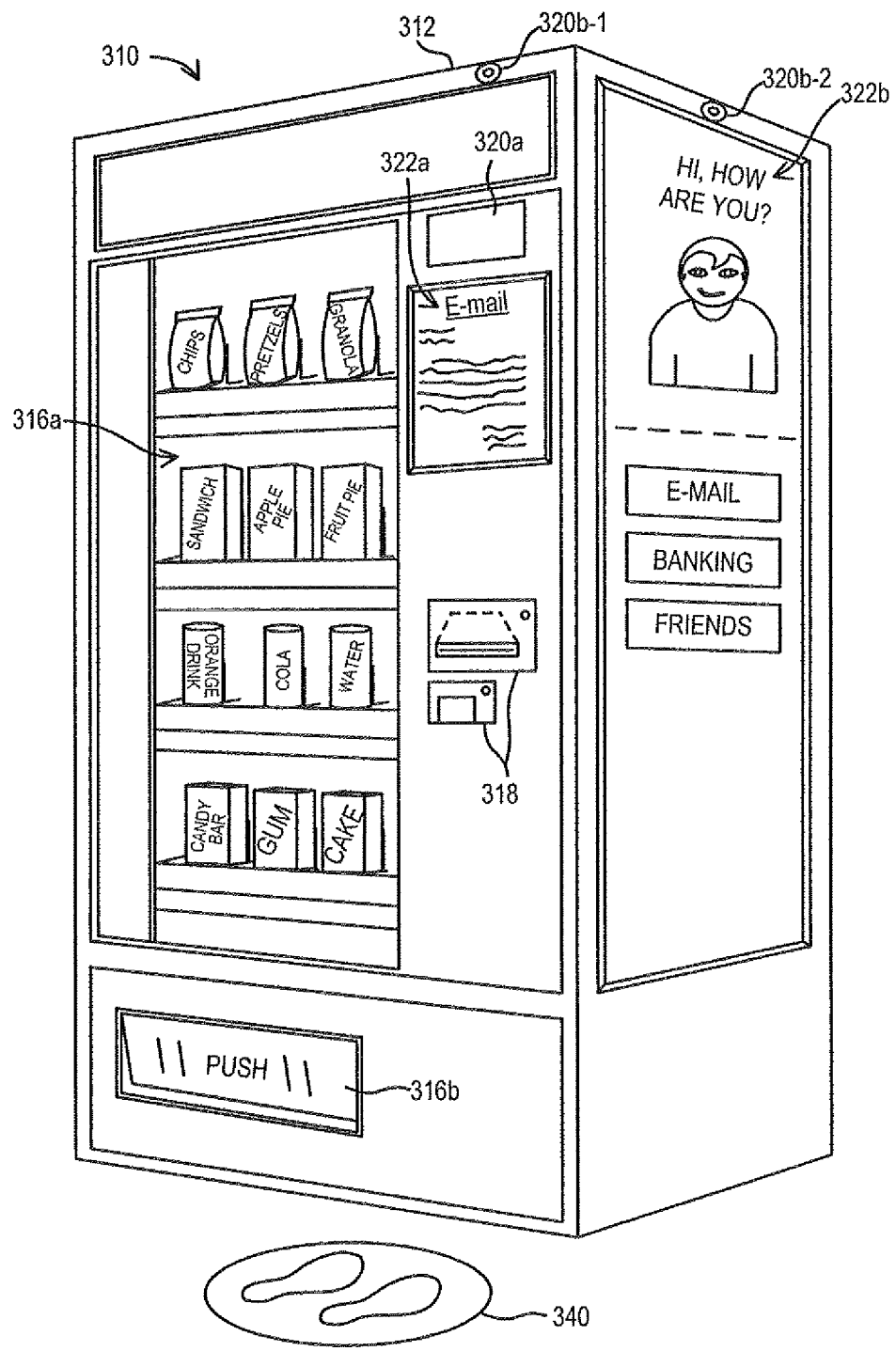
FIG. 3A and FIG. 3B are perspective diagrams of an apparatus according to some embodiments.
Figure 3B:
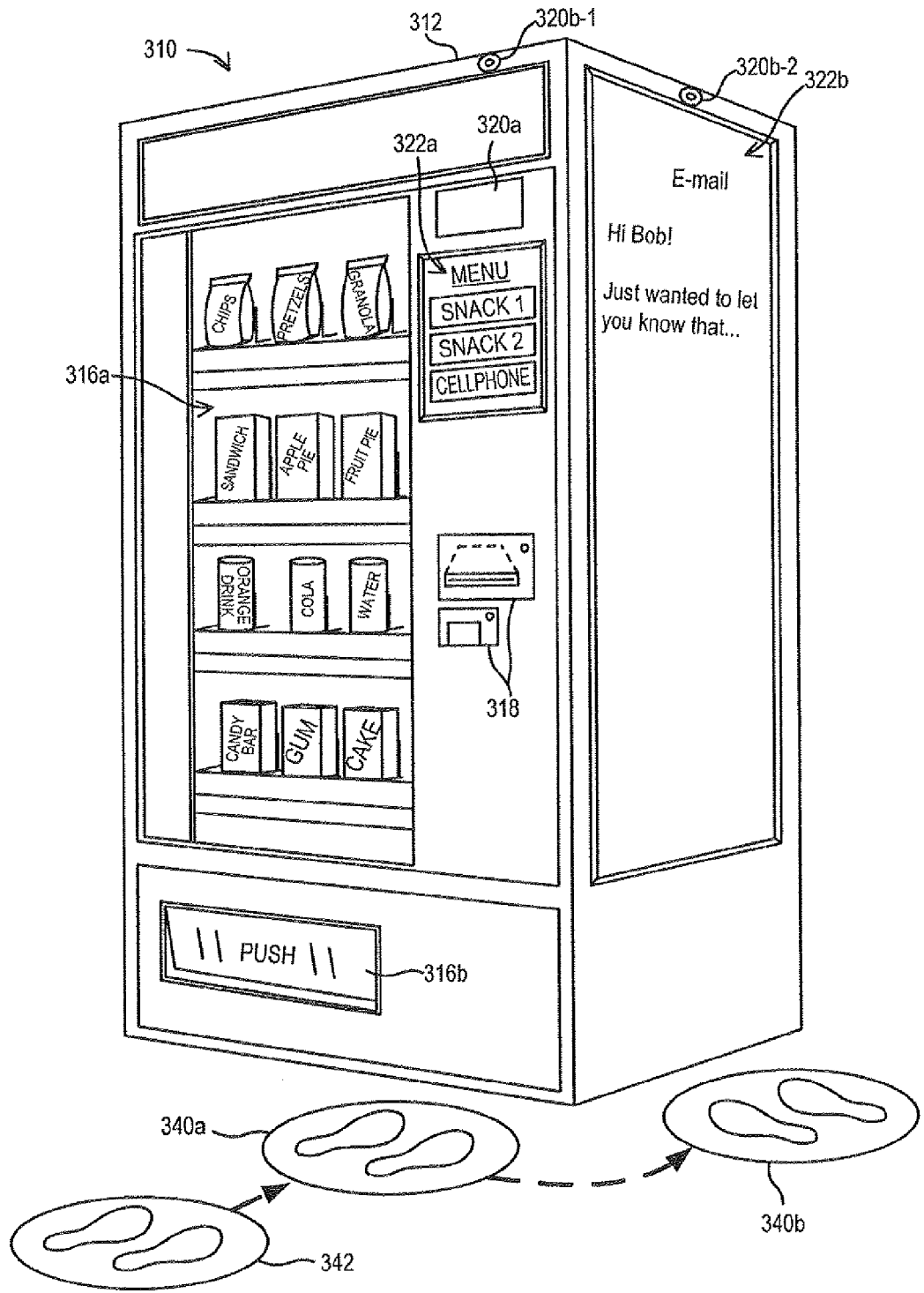

In some embodiments, it may be determined and/or detected that other customers need to use the social/retail hotspot. Sensors of the social/retail hotspot may detect presence of others waiting to use the social/retail hotspot behind the current user of the big screen (e.g., via video cameras, IR sensors, motion detectors, etc.). With reference to FIG. 3A and FIG. 3B, for example, an exemplary vending machine 310 is shown. In some embodiments, the vending machine 310 may similar in configuration and/or functionality to the social/retail hotspot 110a-n of FIG. 1 and/or the apparatus 210 of FIG. 2. The vending machine 310 may comprise, for example, a cabinet or casing 312 that houses and/or otherwise couples to product storage and/or dispensing devices 316 (e.g., a product storage area 316a and/or a product dispensing area 316b), payment processing devices 318, input devices 320 (e.g., a motion detector 320a, a first camera 320b-1, and/or a second camera 320b-2), and/or output devices 322 (e.g., a primary display device 322a and/or a secondary display device 322b). Any or all of the components 312, 316a-b, 318, 320a-b, 322a-bof the vending machine 310 may be similar in configuration and/or functionality to any similarly named and/or numbered devices described herein.

In some embodiments, a first customer may be detected by the vending machine 310 (and/or by the motion detector 320a and/or the first camera 320b-1). The motion detector 320a may detect, for example, the first customer standing in a first position 340 of FIG. 3A. In some embodiments, the presence of the first customer at the first position may be assumed in the case that the first customer is conducting/participating in an interface session via the primary display device 322a. It should also be understood that while the motion detector 320a is depicted in a certain position on the vending machine 310, other positions and/or configurations may also or alternatively be suitable. In one embodiment, for example, the motion detector 320a may comprise a pressure-sensitive mat and/or sensor situated to detect the first customer in the first position 340. As shown in FIG. 3A, the first customer may initiate and/or conduct the first interface session via the primary display device 322a, such as by, for example, checking the first customer's e-mail.

In some embodiments, such as in the case that products dispensed via the vending machine 310 may only be ordered and/or selected via the primary display device 322a, it may be desirable to prevent a line from forming behind the first customer, particularly if the first customer has already purchased a product from the vending machine 310 and/or if the first customer is conducting non-purchase transactions via the first interface session. It may also or alternatively be otherwise desirable to switch the first customer's first interface session to the secondary display device 322b. Thus, according to some embodiments, it may be determined whether to transfer the first customer to the secondary display/screen 322b.

In the case that a second customer is detected, in waiting position 342 of FIG. 3B, for example, it may be determined whether the first customer can easily and/or appropriately be transferred to the secondary display device 322b (e.g., an algorithm determines activity of current primary screen 322b user; if user's activity is interruptible (for just a moment), then user is transferred to the secondary screen 322b; if user's activity is not interruptible, then detected waiting user is prompted to use the secondary screen 322b; if the user's activity is of a typically private nature, etc.). In the case that is determined that the first customer should be moved to the secondary display device 322b, the first customer may be prompted such as by: displaying a message on the primary screen 322a; activating an audio message; displaying a pictorial sign showing the waiting user the presence of the secondary screen 322b; and/or flashing the secondary screen 322b. In such a manner, for example, the first customer may continue the first interface session via the secondary display 322b, such as by repositioning from the first position 340a in FIG. 3B, to the second position 340b, and continuing to read the first customer's email (as shown). This allows the second customer to move from the waiting position 342 to the first position 340a (so that the second customer may now interface with the vending machine via the primary display 322a). While the switching of the first customer from one screen to another has been described with respect to switching from a smaller primary display 322a to a larger secondary display 322b, it should be understood that the opposite switching procedure is also fully contemplated. In some embodiments, for example, the primary display 322a may comprise the "bigger" or large screen, for example, and/or may be situated on the side of the vending machine 310. Further, in embodiments where at least one of the displays 322a, 322b is moveable (e.g., coupled to a repositioning arm or device), the switching may comprise instructing the first customer to reposition the primary display 322a, and/or automatically (e.g., via a motor) repositioning the primary display 322a (e.g., to become the secondary display 322b). Also, as described elsewhere herein, while the displays 322a, 322b are generally described as output devices 322, it should be understood that the displays 322a, 322b may also function as input devices 320 in the case that the displays 322a, 322b comprise touch screen displays.

The social/retail hotspot may also or alternatively detect use of the system by multiple users and their expected use times. If one user is purchasing an item, the expected use time is short, but if another user is using an internet interface, then expected use time is long. The social/retail hotspot may then, for example, display which screen is likely to become available first, notifying the waiting user of their expected wait-time; move free or less revenue generating activities to smaller side screens when a new user is detected approaching the kiosk; and/or detect the identity of its users.

In some embodiments, there may be limitations on how long a user is allowed to operate the social/retail hotspot (such as the vending machine 310 of FIG. 3A and FIG. 3B). Such as: limitations on how long to use big screen; limitations on how long to use either big or small screens; limitations that are time-based (e.g., ten (10) minutes, between 4 PM and 8 AM) and/or usage based (e.g., one (1) Gb of data transfer); each user may only be allowed to use the auxiliary services a limited number of times per day; limitations may be determined based on identity of user (e.g., customer history); gold-level customers get to use Internet access on the social/retail hotspot for ten (10) minutes, but platinum-level customer gets to used Internet access for twenty (20) minutes; and/or the social/retail hotspot can shorten the length of free or less revenue generating activities when all screens are in use and there are waiting users.

Figure 4:
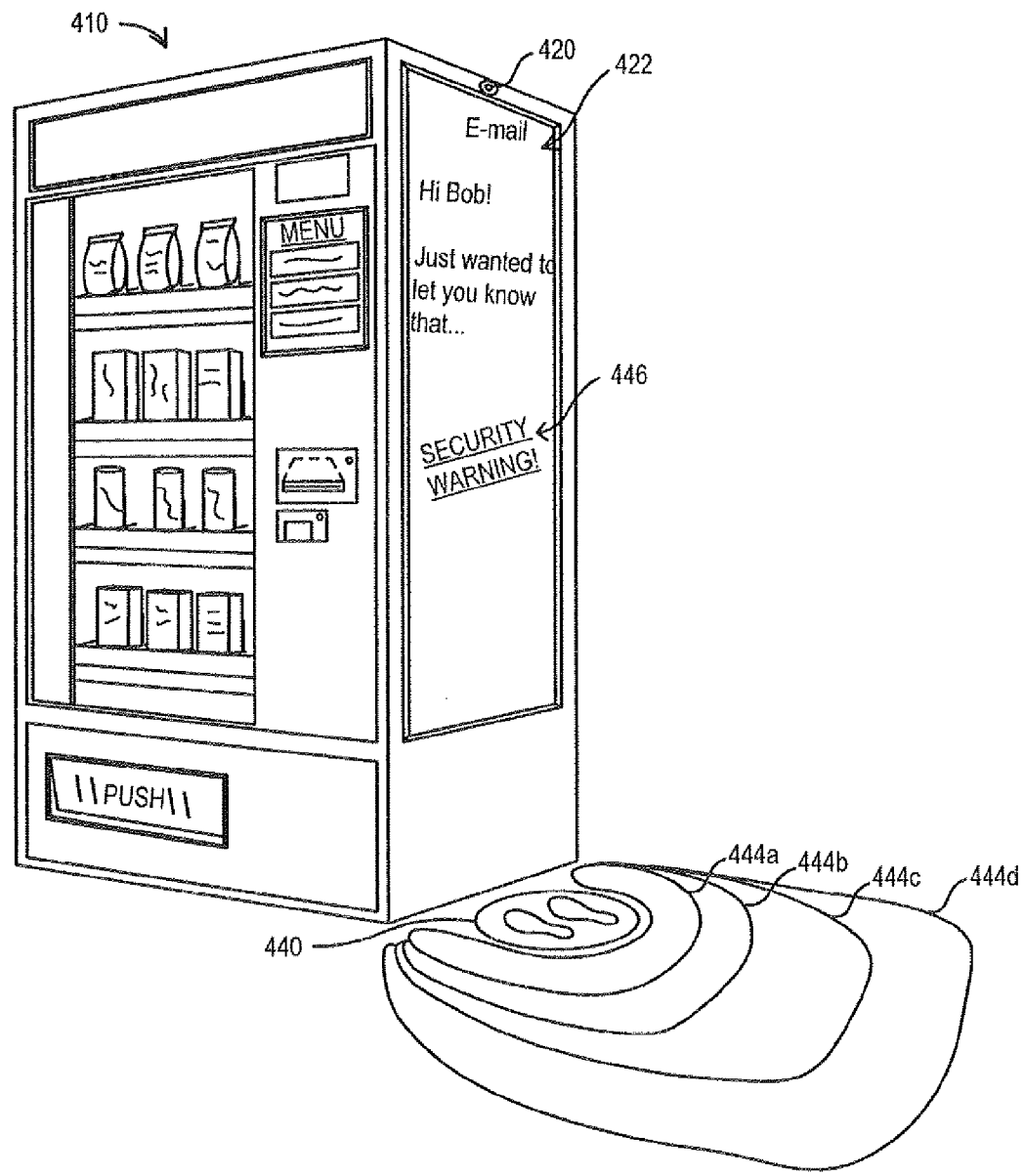
FIG. 4 is a perspective diagram of an apparatus according to some embodiments.

In some embodiments, any screen of the social/retail hotspot may have privacy features. Examples of privacy features include, but are not limited to: a screen guard to limit viewing angle; customer may be required to wear special glasses (e.g., other people who are not wearing the glasses may not be able to easily view the screen); and/or sensors (e.g., camera, motion sensor) are used to determine if somebody else is present (e.g., walking by) behind the current user. With reference to FIG. 4, for example, an exemplary hotspot 410 is shown. In some embodiments, the hotspot 410 may similar in configuration and/or functionality to the social/retail hotspot 110a-n of FIG. 1, the apparatus 210 of FIG. 2, and/or the vending machine 310 of FIG. 3A and FIG. 3B. The hotspot 410 may comprise, for example, a camera 420 and/or an interface screen 422, either or both of which may be similar in configuration and/or functionality to any similarly named and/or numbered devices described herein.

In some embodiments, a customer may be standing and/or otherwise positioned at the location 440 shown in FIG. 4 (e.g., such that the customer may utilize the interface screen to interface with the hotspot 410). The hotspot 410 may be configured to identify whether another person is present in one or more zones 444 proximate to the location 440 of the customer. The camera 420 may provide visual data to a program that analyzes whether (i) another person is present proximate to the location 440 of the customer and/or (ii) which of the one or more zones 444 the detected person is in. Other sensors such as motion sensors and/or pressure sensors may also or alternatively be utilized for such purposes.

In some embodiments, if another person is detected (e.g., by the camera 420 and/or by another device in communication with the hotspot 410), a warning message 446 may be output to the user, and/or the screen 422 may be disabled (or partially disabled) to prevent the other person from viewing it (privacy features like these may be helpful if customers use the social/retail hotspot 410 for web browsing, reading email, obtaining medical or financial information, etc.). According to some embodiments, the hotspot 410 may implement a hierarchy of privacy features based on, for example, which of the one or more zones 444 the other person is detected in. For exemplary purposes only, for example, FIG. 4 depicts a first zone 444a, a second zone 444b, a third zone 444c, and a fourth zone 444d—each of which the hotspot 410 may be programmed to be capable of determining whether the other person is situated within.

The warning message 446 may be displayed on the interface screen 422 in the case that the other person is detected in the fourth zone 444d, for example. In some embodiments, this may be considered a first level of security and/or privacy protection. In the case that the other person is detected in the third zone 444c (or in the case that the other person is detected as having moved from the fourth zone 444d to the third zone 444c), the hotspot 410 may implement a second level of security and/or privacy (such as, for example, reducing the text size of the font utilized to display information to the customer via the interface screen 422). In the case that the other person is detected in the second zone 444b (or in the case that the other person is detected as having moved from the third zone 444c to the second zone 444b), the hotspot 410 may implement a third level of security and/or privacy (such as, for example, strategically moving and/or organizing information displayed via the interface screen 422 so that the body of the customer is likely to block the view of the other person). In the case that the other person is detected in the first zone 444a (or in the case that the other person is detected as having moved from the second zone 444b to the first zone 444a), the hotspot 410 may implement a fourth and/or highest level of security and/or privacy (such as, for example, temporary disabling the interface screen 422 and/or switching the customer's interface session to a smaller secondary screen, e.g., on another side of the hotspot 410).

It should be understood that the zones 444*a-d* depicted in FIG. 4 are exemplary in number, size, and shape. Fewer or more zones 444 may be utilized to implement security/privacy features for the interface screen(s) 422 of the hotspot 410. It should be further understood that, for ease of illustration, the zones 444 of FIG. 4 are depicted as representing approximate foot positioning of the other detected person. In practice, zones 444 may be also or alternatively defined vertically in a third dimension. A motion sensor (not shown explicitly in FIG. 4), for example, may detect movement beyond the periphery of the customer, such as detecting another person looking over the shoulder of the customer, without specific regard for where the feet of the other person may be positioned. In some embodiments, such as in the case that a pressure-sensitive mat is utilized to detect customers and/or other people, any or all zones 444 may be solely defined by where such individuals are standing.

VII. Coin Collecting Application

Figure 5:
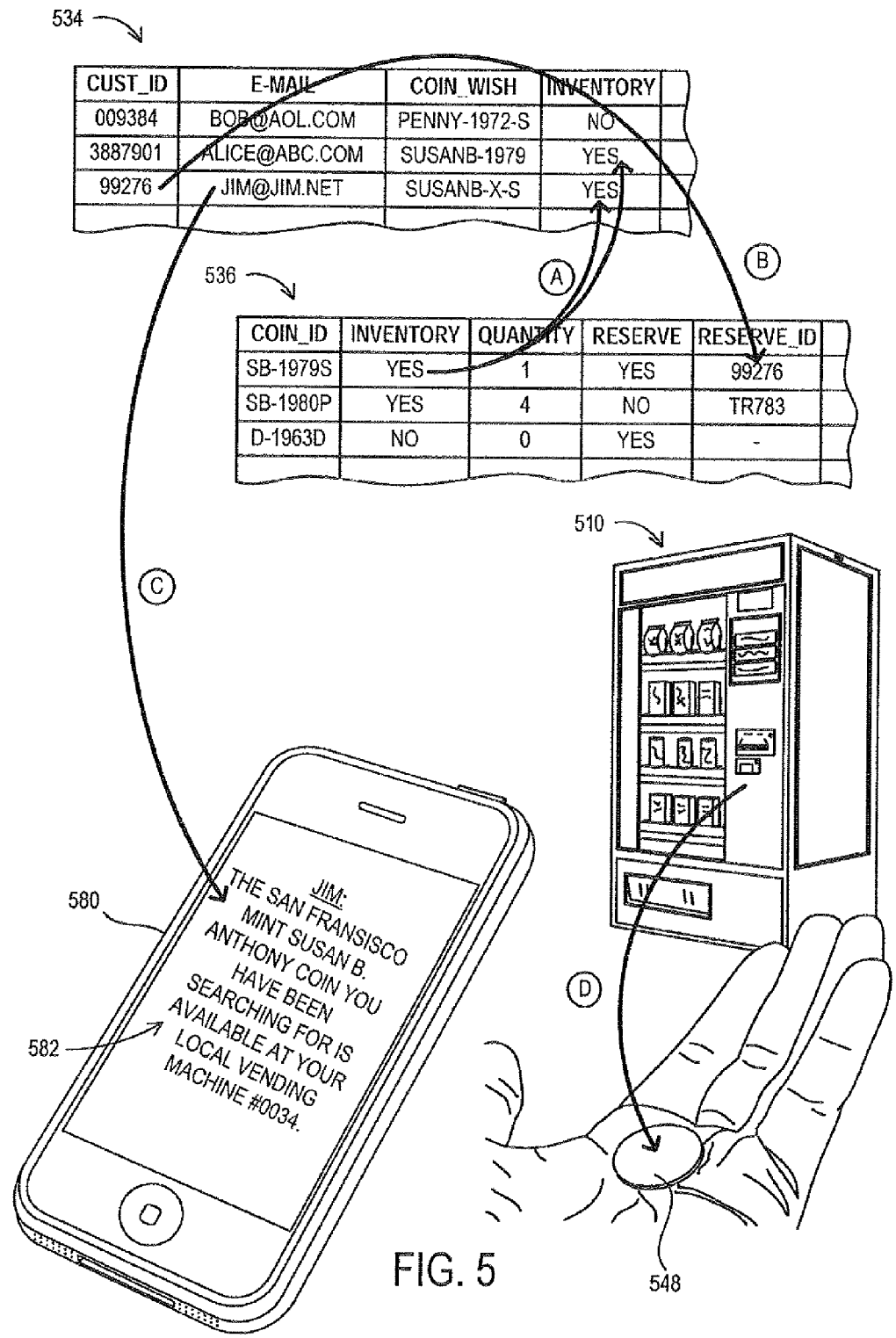
FIG. 5 is a diagram of a system according to some embodiments.

According to some embodiments, a social/retail hotspot may facilitate hobbies of customers, such as coin collecting. As shown in FIG. 5, for example a system according to some embodiments is shown. In some embodiments, the system comprises a vending machine 510, a customer database 534, a coin inventory database 536, a coin 548, and a customer device 580 operable to receive an e-mail 582. The vending machine may, according to some embodiments, be similar in configuration and/or functionality to the social/retail hotspot 110*a-n* of FIG. 1, the apparatus 210 of FIG. 2, the vending machine 310 of FIG. 3A and FIG. 3B, and/or the hotspot 410 of FIG. 4. The customer device 580 may, in some embodiments, be similar in configuration and/or functionality to the customer device 180 of FIG. 1.

In some embodiments, customers, particularly customers registered with and/or otherwise identifiable to the vending machine 510, may provide information to the vending machine 510 and/or to a device associated with the vending machine 510 (e.g., a website, server, and/or controller—such as the controller 150 of FIG. 1) regarding what coins the customer desires to collect. Indeed, the customer may manage coin collection by interfacing with the vending machine 510 and/or associated device. The customer database 534 may store, as shown in FIG. 5 for example, an identifier for the customer, an e-mail address (and/or other contact or identifying information) for the customer, an indication of one or more coins (or other currency) that the customer desires or "wishes" (e.g., a coin/currency "wish list"), and/or an indication regarding whether the desired coin/currency is in the inventory of the vending machine 510.

The coin inventory database 536 may store, as shown in FIG. 5 for example, an identifier for each coin/currency and/or type of coin/currency stored (or potentially stored) in the vending machine 510, an indication as to whether the particular coin/currency and/or type of coin/currency is currently in inventory at the vending machine 510, an indication of the quantity of the coin/currency in inventory at the vending machine 510, an indication of whether one or more units of the coin/currency have been reserved (e.g., by a customer that desires the particular type of coin/currency), and/or an identifier of the reservation, if applicable.

As an example, the customer identified by the number "99276" in the customer database 534 of FIG. 5, may desire a Susan B. Anthony dollar coin minted in San Francisco, and may provide an indication of such desire/wish to the vending machine 510 and/or a device associated therewith (e.g., via a website associated with the vending machine 510). The customer may, in some embodiments, reserve the desired coin, such that the vending machine 510, once it acquires the desired coin, will only dispense the desired coin (or at least one unit thereof) to the customer "99276". In some embodiments, the customer must pay for the reservation service and/or for the coin collection management service offered via the vending machine 510 (e.g., via a subscription and/or recurring charge or upon visiting the vending machine to retrieve a desired coin/currency item).

Either upon stocking of the vending machine 510 or upon receipt of new coin deposited into the vending machine 510 (e.g., via customer transactions at the vending machine 510), the vending machine 510 may update the coin inventory database 536 to reflect the current inventory of the vending machine 510. The vending machine 510 may then determine, as represented by the arrows labeled "A" in FIG. 5 for example, that a coin desired by the customer "99276" and by the customer "3887901" is present in inventory. The vending machine 510 may then determine, for example, that the coin is reserved by customer "99276", as represented by the arrow labeled "B" in FIG. 5. According to some embodiments, the vending machine 510 and/or a device associated therewith (e.g., a controller or server) may notify the customer "99276" that the desired coin is available at the vending machine 510. As represented by the arrow labeled "C" in FIG. 5, for example, the e-mail address of the customer may be retrieved from the customer database 534 and utilized to send the e-mail 582 to the customer device 580. While the customer device 580 is depicted as comprising a cellular telephone, it should be understood that the customer device may comprise any type of device and/or electronic device associated with the customer, including, but not limited to: (i) a mailbox; (ii) a wireless telephone; (iii) a pager; (iv) a personal computer; (v) a laptop computer; (vi) a gaming console; and/or (vii) any type or configuration of portable, wireless, and/or mobile communications device.

As depicted in FIG. 5, the e-mail 582 may indicate that the desired coin is available at the vending machine 510. In the case that a plurality of vending machines are networked together (e.g., and managed by a controller), the e-mail (and/or other notification communication) may also indicate an identifier of a specific vending machine and/or an indication of a location of the vending machine 510. The e-mail 582 may also or alternatively include directions to the vending machine 510, such as on-the-fly directions based on a current location of the customer (and/or a current location of the customer device 580). The e-mail 582 may also or alternatively provide information descriptive of how the desired coin may be obtained by the customer. In some embodiments, for example, the customer may be required to pay a price to obtain the coin, may be required to make a purchase and/or specific purchase from the vending machine 510 (e.g., of a food and/or beverage product stored by the vending machine 510), and/or may be required to enter a code into the vending machine 510. In some embodiments, such as in the case that the vending machine comprises a barcode scanner (not shown), the e-mail 582 (and/or other notification communication) may comprise an indication of a barcode representing the desired coin.

As represented by the arrow labeled "D" in FIG. 5, the customer may then interface with the vending machine 510 to have a unit (which may be the only unit in inventory, as in the depicted example) of the desired coin 548 dispensed to the customer. The customer may provide biometric data (e.g., via a thumbprint reader (not explicitly shown)) and/or other information by which the vending machine 510 may identify the customer, for example. In the case that a previous reservation of the desired coin 548 (for payment or not) guarantees the coin 548 for the customer, the unit of the desired coin 548 may automatically be dispensed upon identification of the customer. In some embodiments, the customer must enter a coin redemption code (e.g., received via the e-mail 582), present an indication of a barcode identifying the desired coin 548 (e.g., via a display screen of the customer device 580; and/or received via the e-mail 582), and/or consummate a transaction for the purchase of an item of product inventory offered via the vending machine (e.g., the customer may purchase "any drink" or "any Mars® candy" to qualify to receive the desired coin 548, and upon payment and/or selection of the appropriate purchase, the coin 548 will be dispensed to the customer).

It should be understood that the databases 534, 536 depicted in FIG. 5 are for exemplary purposes only. Fewer or more databases, data tables, files, matrices, and/or other data stores may be utilized. Any number or type of fields that is or becomes desirable may also or alternatively be utilizes without deviating from the scope of some embodiments.

VIII. Hardware

Figure 6:
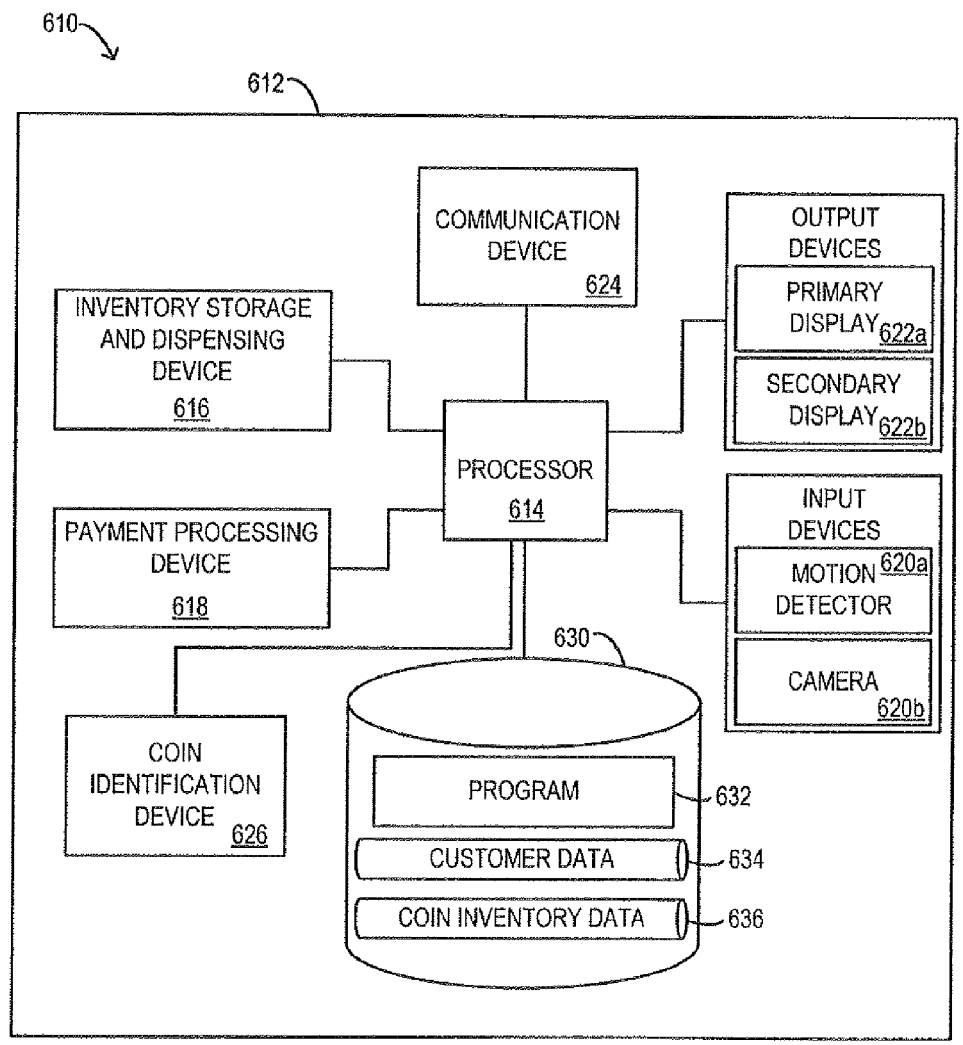
FIG. 6 is a block diagram of an apparatus according to some embodiments.

Turning now to FIG. 6, a block diagram of an exemplary social/retail hotspot 610 according to some embodiments is shown. In some embodiments, the social/retail hotspot 610 may be similar in configuration and/or functionality to the social/retail hotspot 110*a-n* of FIG. 1, the apparatus 210 of FIG. 2, the vending machine 310 of FIG. 3A and FIG. 3B, the hotspot 410 of FIG. 4, and/or the vending machine 510 of FIG. 5. The social/retail hotspot 610 may comprise, for example, a casing 612 enclosing one or more of a processor 614, an inventory and dispensing device 616, a payment processing device 618, an input device 620 (such as a motion detector 620*a* and/or a camera 620*b*), an output device 622 (such as a primary display 622*a* and/or a secondary display 622*b*), a communications device 624, a coin identification device 626, and/or a data storage device 630. According to some embodiments, the social/retail hotspot 610 may be configured to perform and/or facilitate processes in accordance with embodiments described herein. The social/retail hotspot 610 may, for example, be utilized to manage and/or facilitate customer coin/currency collecting, implement tiered security and/or privacy protocols based on characteristics of detected persons proximate to the social/retail hotspot 610, and/or reduce service queues and/or otherwise enhance service by switching users between provided output devices 622.

A. Casing/Cabinetry

In some embodiments, a suitable casing 612 and/or cabinetry may be constructed from any suitable material, including but not limited to any combination of (1) commercial grade sixteen-gauge steel (e.g., for exterior panels and internal shelving), (2) transparent materials such as glass or Plexiglas (e.g., for product display windows), (3) rubber (e.g., for waterproofing insulation), (4) plastic, and/or (5) aluminum.

Many commercially available casings 612 may be adapted to work in accordance with various embodiments. For example, in vending machine (and particularly, snack machine) embodiments, a suitable casing 612 may comprise the "129 SnackShop" manufactured by Automatic Products International, Ltd. of Saint Paul, Minn., which stands at seventy-two inches (72"/1829 mm) wide, has a width of thirty-eight and seven eighths inches (38⅞"/988 mm), and a depth of thirty-five inches (35"/889 mm). Other suitable snack machine casings 112 include the A La Carte® machine from Automatic Products, and the GPL SnackVendor model #159 from Crane Merchandising Systems/Crane Co. of Stamford, Conn.

In beverage machine embodiments, casings 612 commercially available from Dixie Narco, Inc. of Williston, S.C. may be employed. Beverage machine casings 212 may comprise a "cooler" or "glass front" style front panel, featuring a transparent front panel (e.g., glass) enabling customers to see inventory for sale. Alternatively, beverage machine casings 212 may comprise a "bubble front" style front panel, featuring a decorative front panel, typically used to advertise a logo of a product manufacturer commercially interested in the operation of the social/retail hotspot 610 (e.g., in the case such a device comprises a vending machine).

Other embodiments are contemplated as well, including combination snack and beverage vending machine embodiments, such as those available from Crain Co. Further details concerning the suitability of machine casings 612 and/or cabinetry are well known in the art, and need not be described in further detail herein.

B. Processor/Controller

According to some embodiments, the social/retail hotspot 610 may include the processor 414 that may be or include any type, quantity, and/or configuration of processor that is or becomes known. The processor 414 may comprise, for example, an Intel® IXP 2800 network processor or an Intel® XEON™ Processor coupled with an Intel® E7501 chipset. In some embodiments, the processor 214 may comprise multiple inter-connected processors, microprocessors, and/or micro-engines. According to some embodiments, the processor 414 may include or be coupled to one or more clocks or timers (not explicitly shown) and to the communication device 624 through which the processor 414 may communicate, in accordance with some embodiments, with other devices such as one or more peripheral devices, one or more servers, and/or one or more user devices (such as the customer device 180 of FIG. 1). The communication device 624 may, for example, comprise any type or configuration of communication port, cable, modem, and/or signal transceiver that is or becomes known or practicable.

In some embodiments, the processor 614 may also or alternatively be in communication with and/or coupled to any number of other components of the social/retail hotspot 610 such as the inventory and dispensing mechanism 616, the payment processing mechanism 618, the input device(s) 620, the output device(s) 622, the coin identification device 626, and/or the data storage device 630.

C. Inventory Storage and Dispensing Device

In some embodiments, the social/retail hotspot 610 may comprise the inventory storage and dispensing device 616. The inventory storage and dispensing device 616 may, according to some embodiments, comprise any number and/or configuration of devices and/or components that facilitate and/or are associated with the storage and/or dispensing of products or services available via the social/retail hotspot 610. Product inventory storage and product dispensing functions of the social/retail hotspot 610 configured in accordance with a vending machine embodiment may include, for example, one or more of: (i) a drive motor, (ii) metal shelves, (iii) a product delivery system (e.g., a chute, product tray, and/or product tray door), (iv) dual spiral (e.g., double helix) item dispensing rods, (v) convertible (e.g., extendable) shelves, and/or (vi) a refrigeration unit. In embodiments using the casing 612 of the "model 129 SnackShop" manufactured by Automatic Products, three (3) removable shelves may be employed, together providing for thirty (30) product rows and an inventory capacity of between one hundred and eighty-five (185) to five hundred and twenty-two (522) commonly vended snack products.

Inventory storage and distribution functions of the social/retail hotspot 610 configured in accordance with a beverage machine embodiment may include one or more conventional components, including: (i) metal and/or plastic shelving, (ii)

product dispensing actuators/motors, (iii) product delivery chutes, and/or (iv) a refrigeration unit.

In many types of beverage and snack vending machines, operators will typically stock several units of the same product linearly arranged in a column, allowing individual units to be dispensed upon command. The same product may be stocked in more than one column. Similarly, more than one product may be stocked in a single column. In the case that one or more services are available via the social/retail hotspot 610, the inventory storage and dispensing device 616 may comprise any device or component that is associated with the storage, transmission, encoding or decoding (e.g., including encryption and decryption), and/or other processing, routing, or electronic delivery or redemption of such services.

Further details concerning vending machine inventory storage and dispensing devices 616 are well known in the art, and need not be described in further detail herein.

D. Payment Processing Device

According to some embodiments, the social/retail hotspot 610 may comprise the payment processing device 618. The payment processing device 618 may, according to some embodiments, comprise any number and/or configuration of devices and/or components for receiving payment and/or dispensing change, including a coin acceptor, a bill validator, a card reader (e.g., a magnetic stripe reader), and/or a change dispenser.

In some embodiments, a magnetic stripe card reader may read data on a magnetic stripe of a credit or debit card, for example, and it may cooperate with conventional POS credit card processing equipment to validate card-based purchases through a conventional transaction authorization network. Suitable card-based transaction processing systems and methods are available from USA Technologies, Inc.™ of Wayne, Pa. In some embodiments, a coin acceptor, bill validator and/or change dispenser may communicate with and/or be coupled to a currency storage apparatus (a "hopper"; not shown) and may comprise conventional devices such as models AE-2400, MC5000, TRC200 by Mars, Inc.™ of West Chester, Pa., or CoinCo™ model 9300-L.

Coin acceptors and/or bill validators may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled "Coin Tube Monitor Means", the payment and coin-related aspects of which are incorporated by reference herein. According to some embodiments, a change dispenser activates the return of coinage to the customer where appropriate (e.g., where a customer collects a coin reserved for the customer). Such apparatus may feature Multidrop Bus (MDB) and/or Micromech peripheral capabilities, as are known in the art.

In another embodiment, the social/retail hotspot 610 may be configured to receive payment authorization and/or product selection commands or signals through a wireless device communication network (e.g., via the communication device 624), directly or indirectly, from a customer device (e.g., a cellular telephone, not shown; the customer device 180 of FIG. 1). In such an embodiment, the payment processing device 618 may comprise a cellular transceiver operatively connected to the processor 614 to receive, transmit, and/or process such signals. Systems and methods allowing for the selection of and payment for vending machine products via cellular telephones are provided by USA Technologies, Inc.™. Further, in such an embodiment, a customer cellular telephone may serve as an input device 620 and/or an output device 622, as described elsewhere herein.

Further details concerning vending machine payment processing devices 618 are well known in the art, and need not be described in further detail herein.

E. Input and Output Devices

According to some embodiments, the social/retail hotspot 610 may comprise the input device(s) 620 and/or the output device(s) 622. In some embodiments, the input device(s) 620 may be operable to receive input from (i) a customer indicating a product and/or offer selection (e.g., a coin collecting "wish list"), from (ii) an operator (or agent thereof) during stocking or maintenance of the social/retail hotspot 610, and/or from (iii) a third party. Also, the output device 622 may be configured for outputting product and/or offer information (such as subscription and/or package deal information and/or promotions) to a customer, operator, and/or third party.

Many combinations of input devices 620 and output devices 622 may be employed according to various embodiments. In some embodiments, the social/retail hotspot 610 may include more than one input device 620. For example, the social/retail hotspot 610 may include a motion detector 620a, a camera, 620b, and/or an exterior input device 620 for receiving customer input and an interior input device 620 (neither shown separately) for receiving operator input. In some embodiments, the input device 620 may provide the dual functionality of receiving input data from both operators and customers (and/or third parties). Likewise, a social/retail hotspot 610 may comprise more than one output device 622 (e.g., a primary display 622a, a secondary display 622b, and/or an LCD screen and several LED devices). In some embodiments, such as those which feature touch screens (described elsewhere herein), the functionality of both input devices 620 and output devices 622 may be provided by a single device and/or type of device.

Many input devices 620 are contemplated. Thus, an input device 620 may comprise, for example, one or more of the following: (i) a set of alpha-numeric keys for providing input to the vending machine, such as the Programmable Master Menu® Keypad, (ii) a selector dial, (iii) a set of buttons associated with a respective set of item dispensers, (iv) a motion sensor, (v) a barcode reader (e.g., a 1-D or 2-D barcode reader), (vi) a voice recognition module, (vii) a Dual-Tone Multi-Frequency receiver/decoder, (viii) a wireless device (e.g., a cellular receiver; a radio-frequency receiver; an infrared receiver; a wireless access point or wireless router; other wireless devices), (ix) a smart card reader, (x) a magnetic stripe reader, (xi) a biometric identification apparatus (e.g., an iris scanner, a retinal scanner, a thumbprint reader, etc.), (xii) a customer device, and/or (xiii) any other type or configuration of input device 620 that may be or become known or practicable.

In some embodiments, an input device 620 may comprise an optical reader (e.g., a 2-D bar code scanner) capable of scanning a barcode, such as a bar code which is displayed on a screen or monitor of a user's cellular phone, PDA, Blackberry® business phone, Blackberry® handheld or other handheld device. One system employing such technology, the Cmode® service, has been developed by a partnership between Coca-Cola® Co. and NTT DoCoMo™ Inc. of Japan. According to some embodiments, the input device 620 may comprise a fingerprint (e.g., and/or thumbprint) reader such as a Fujitsu MBF200 Scanner, which is manufactured by Tacoma Technology, Inc of Taipai, Taiwan and Fujitsu® Microelectronics America, Inc. of Tokyo, Japan. The Fujitsu® MBF200 offers a resolution of five hundred dots per inch (500 dpi), an image capture area of 12.8×15 mm (0.5"×0.6"), and a unit size of 60×40×15 mm (2.4"×1.6"×0.6"). The Fujitsu® MBF200 may communicate with a vending machine processor 214 through any practicable interface such as a USB interface. The Fujitsu® MBF200 may be desirable in an embodiment where the vending machine processor 214 is instructed through a Linux-based operating system. In embodiments featuring the Fujitsu® MBF200, fingerprint-matching software may be employed. Exemplary fingerprint matching software may include, for example, VeriFinger™ 4.2 from Neurotechnologija, Ltd. of Vilnius, Lithuania.

In some embodiments, a suitable fingerprint reader for use as an input device 620 may include the AF-S2 FingerLoc™ from AuthenTec®, Inc. of Melbourne, Fla. The AF-S2 FingerLoc™ offers a resolution of two hundred and fifty dots per inch (250 dpi), an image capture area of 13×13 mm (0.51"× 0.51"), and a unit size of 24×24×3.5 mm (0.94"×0.94"×0.14"). The AF-S2 FingerLoc™ may communicate with the processor 614 through any practicable interface such as a USB interface. The AF-S2 FingerLoc™ may be desirable in an embodiment where the processor 614 is instructed through a Microsoft® Windows®-based operating system. In embodiments featuring the AF-S2 FingerLoc™, fingerprint matching software may be employed. Exemplary fingerprint matching software may include, for example, VeriFinger™ 4.2 from Neurotechnologija, Ltd. of Vilnius, Lithuania.

Likewise, many types of output devices 622 are contemplated. For example, an output device 622 may comprise an LCD screen or device. Alternatively or additionally, the output device 622 may comprise one or more LED displays or devices (e.g., several alphanumeric multi-color or single color LED displays on the shelves of a vending machine associated proximately with each row of product inventory).

In one embodiment, an LED display screen is mounted atop the social/retail hotspot 610 (via bolts or other mounting hardware) and is used to communicate offers and other messages (e.g., product advertisements, such as package deals and/or subscription offers or promotions) to prospective customers. A suitable LED display screen for such an embodiment may be housed in an aluminum case having a length of approximately twenty-seven and one half inches (27.5"/698.5 mm), a height of approximately four and one quarter inches (4.25"/107.95 mm), and a depth of approximately one and three quarter inches (1.75"/44.5 mm). Such a display screen may have a display area capable of showing about thirteen (13) alphanumeric and/or graphical characters. Further, such an LED display screen may comprise a serial computer interface, such as an RJ45/RS232 connector, for communicating with the processor 614. Further still, such an LED display may be capable of outputting text and graphics in several colors (e.g., red, yellow, green, black) regarding current and upcoming promotions.

Further, in some embodiments, the output device 622 may comprise a printer. In one embodiment, a printer may be configured to print on card stock paper of approximately one hundredth of an inch or less (e.g., 0.01"/0.15 mm or less) in thickness, such as the EPSON EU-T400 Series Kiosk Printer. Further, a printer may be capable of thermal line printing of various alphanumeric and graphical symbols in various font sizes (e.g., ranging from nine (9) to twenty-four (24) point) on various types of paper. Additionally, such a printer may communicate with the processor 614 via an RS232/IEEE 12834 and/or bi-directional parallel connection. Such a printer may further comprise a data buffer of various practicable sizes, such as approximately four kilobytes (4 KB). In some embodiments, the printer may be operable to output codes and/or identifiers (e.g., by printing vouchers) to customers and/or to print stickers, labels, and/or other indications to be attached to products vended by the social/retail hotspot 610. The output device 622 may also or alternatively comprise a device operable to attach and/or print indications of access codes onto one or more products of the social/retail hotspot 610 (e.g., as the products are loaded by an operator, while the products are shelved within the social/retail hotspot 610, and/or as the products are dispensed—such as a hopper printing and/or coupling mechanism). According to some embodiments, the output device 622 may also or alternatively comprise an audio module, such as an audio speaker, that outputs information to customers audibly.

As stated, in some embodiments, a touch-sensitive screen may be employed to perform both input device 620 and output device 622 functions. Suitable, commercially available touch screens for use according to various embodiments are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, and/or (iii) a third screen layer comprising a glass substrate with a uniform-conductive coating. Further, such touch screens may be configured to detect input within a determined positional accuracy, such as a standard deviation of error less than plus or minus eight hundredths of an inch (±0.08"/2 mm). The sensitivity resolution of such touch screens may be more than one hundred thousand touchpoints per square inch (100,000 touchpoints/in$^2$/15,500 touchpoints/cm$^2$) for a thirteen inch (13") touch screen. For such touch screens, the touch activation force required to trigger an input signal to the processor 614 via the touch screen may typically be around two to four ounces (2-4 ounces/57-113 g). Additionally, touch screens for use according to various embodiments may be resistant to environmental stressors such as water, humidity, chemicals, electrostatic energy, and the like. These and other operational details of touch screens (e.g., drive current, signal current, capacitance, open circuit resistance, and closed circuit resistance) are well known in the art and need not be described further herein.

In some embodiments, input and/or output functionality of the social/retail hotspot 610 may be facilitated through a wireless device configured to send data to, and/or receive data from, a customer device (e.g., the customer device 180 of FIG. 1), such as a laptop computer or a cellular telephone. In some embodiments, such a wireless device may comprise a sensor that detects signals from a customer device. Such signals may include but are not limited to radio frequency signals and/or IR signals. Thus, in one or more embodiments, a wireless input device 620 may comprise a WAP or router configured to operate in accordance with an IEEE 802.11 standard, including the 802.11b and 802.11g standards, which transmit at 2.4 GHz, or the 802.11a standard, which transmits at 5 GHz. Such a wireless input device 620 may, in some embodiments, have the capability to "frequency hop" between radio frequencies so as to reduce interference and/or increase security. Encryption techniques may also or alternatively be employed to increase the security of transmissions. Suitable WAPs are available from Belkin™ Corporation of Compton, Calif. and Cisco™ Systems, Inc. of San Jose, Calif. The wireless input device 620 may, in some embodiments, be used to establish a communication link as described herein.

Additionally, in some embodiments, an output device 622 may comprise an audio module, such as an audio speaker, that outputs information to customers audibly. Speakers may comprise conventional speakers and/or modern hypersonic speakers. An output device 622 may include, for example, unidirectional and/or hypersonic speakers which can selectively focus sound to particular locations or customers, while not disturbing others who are not in the location of the focused sound. For a description of such speakers, see Suzanne Kantra Kirschner, "We've heard hypersonic sound. It could change everything", Popular Science, available at http://www.popsci.com/popsci/science/article/0,12543, 351353,00.html, the unidirectional and/or hypersonic speaker concepts and descriptions of which are hereby incorporated by reference herein.

In some embodiments, the output device 622 may comprise a physical device having a game theme, such as a spinning "prize wheel" similar to those featured on the television game show Wheel of Fortune™ or The Price is Right™, a roulette wheel, mechanical slot machine reels, or the like. Such a wheel may communicate to customers various information. For example, the wheel may spin and stop on an icon that represents, e.g., a prize entitlement. A physical wheel in the general appearance of the wheel on the Wheel of Fortune™ game show may be attached to a vending machine.

Also or in addition to a wheel, another output device 622 that is a peripheral device attached to and in communication with the social/retail hotspot 610 may communicate game-related information. By utilizing such an output device 622, the social/retail hotspot 610 may be retrofitted with a separate device to employ game-themed promotions. The use of removable peripheral devices may be important in certain situations (e.g., where doorways to interior locations are low), as such satellite devices may be removed during transport and attached once social/retail hotspots 610 are brought to the intended location. Likewise, such peripheral devices may be side-mounted, where the ceiling height may impair other location of the peripheral. Further, the use of a separate device is advantageous in that it may be in communication with more than one social/retail hotspot 610, allowing many social/retail hotspots 610 to participate in game-themed vending promotions.

F. Coin Identification Device

In some embodiments, the social/retail hotspot 610 may comprise the coin identification device 626. The coin identification device 626 may generally comprise any type or configuration of known device that is operable to read data from and/or determine characteristics of coins and/or paper currency stored by the social/retail hotspot 610. The coin identification device 626 may, according to some embodiments, be more complex and/or advanced than devices typically implemented to determine whether a given deposited coin is a dime, quarter, etc., or whether a deposited bill is a one dollar ($1) or five dollar ($5) bill. Such devices are well-known and widely used. The coin identification device 626, according to many embodiments, is capable of determining more detailed information regarding inventoried coins and/or paper monies. The coin identification device 626, for example, may comprise an optical scanner and/or may employ Optical Character Recognition (OCR) to determine what year a coin was minted, what series year a dollar bill is from, which Treasury Secretary signed a given paper money unit, whether a coin or bill has writing/inscription in certain areas (including on the edge of a coin), etc.

The coin identification device 626 may also or alternatively be utilized to determine a quality of a coin and/or bill. The coin identification device 626, for example, may identify scratches, tears, rips, dings, corrosion, and/or other characteristics used to identify the quality of a coin or bill specimen for collecting purposes. Customers may, in such embodiments, specify a particular quality or grade of coin or bill desired (e.g., along with type, year of minting, etc.) and/or customers may deposit a coin or bill for the sole purpose of grading the collection specimen (e.g., for a small fee, or if a snack or beverage (or other product) is purchased).

G. Data Storage/Memory

The data storage device 630 may include any appropriate combination of magnetic, optical and/or semiconductor memory, and may include, for example, additional processors, communication ports, RAM, Read-Only Memory (ROM), a compact disc and/or a hard disk. The processor 614 and the storage device 630 may each be, for example: (i) located entirely within a single computer or other computing device; or (ii) connected to each other by a remote communication medium, such as a serial port cable, a Local Area Network (LAN), a telephone line, RF transceiver, a fiber optic connection and/or the like. In some embodiments for example, social/retail hotspot 610 may comprise one or more computers (or processors 614) that are connected to a remote server computer (e.g., via the communication device 624) operative to maintain databases, where the data storage device 630 is comprised of the combination of the remote server computer and the associated databases.

The data storage device 630 may generally store one or more programs 632 for controlling the processor 614. The processor 214 may perform instructions of the program 632, for example, and thereby operate in accordance with some embodiments, and particularly in accordance with the methods described in detail herein. According to some embodiments, the program 632 may comprise any number or type of programs that are or becomes known or practicable. In some embodiments, the program 632 may be developed using an object oriented programming language that allows the modeling of complex systems with modular objects to create abstractions that are representative of real world, physical objects and their interrelationships. However, it would be understood by one of ordinary skill in the art that the embodiments described herein can be implemented in many different ways using a wide range of programming techniques as well as general purpose hardware systems or dedicated controllers.

The program 632 may be stored in a compressed, un-compiled and/or encrypted format. The program 632 furthermore may include program elements that may be generally useful, such as an operating system, a database management system and/or device drivers for allowing the processor 614 to interface with computer peripheral devices and/or the various components of the social/retail hotspot 610. Appropriate general purpose program elements are known to those skilled in the art, and need not be described in detail herein.

Further, the program 632 may be operative to execute a number of invention-specific objects, modules and/or subroutines which may include (but are not limited to) one or more subroutines to determine coin inventory, determine if customers are proximate to specific portions of the social/retail hotspot 610, determine if a customer's session should be switched from a first interface to a second interface, determine whether to implement security/privacy protocols, determine whether a coin in inventory matches a coin desired by a customer, determine whether to reserve a coin, determine whether to dispense a particular coin, etc. The program 632 may also or alternatively comprise one or more procedures for causing the processor 614 to identify specific characteristics of a coin or bill in inventory (Such as year of minting) and/or determine a collection-specific grading or quality of a particular coin or bill. Examples of some of these subroutines and their operation are described in detail with respect to the processes described elsewhere herein.

According to some embodiments, the instructions of the program 632 may be read into a main memory (not explicitly shown) of the processor 614 from another computer-readable medium (such as the data storage device 630), like from a ROM to a RAM. Execution of sequences of the instructions in the program 632 may cause the processor 614 to perform the process steps described herein. In alternative embodiments, hard-wired circuitry or integrated circuits may be used in place of, or in combination with, software instructions for implementation of the processes described herein. Thus, some embodiments are not limited to any specific combination of hardware, firmware, and/or software.

In addition to the program 632, the data storage device 630 may also be operative to store one or more databases, files, and/or tables, containing information such as (i) customer data 634 and/or (ii) coin inventory data 636. Any number of other arrangements may be employed besides those suggested by the tables shown. For example, even though two separate data tables, stores, files, and/or databases are illustrated, embodiments may be practiced effectively using fewer or more functionally equivalent databases or similar structures. These databases and/or other databases (not shown) may also or alternatively store information associated with security protocols and/or coin collecting data/management. Codes and/or identifiers, rules or parameters, transaction history data, third party data, and/or other metrics may, for example, be stored to facilitate the embodiments described herein being practiced via the social/retail hotspot 610.

Further, despite the depiction of the data as tables, an object-based model could be used to store and manipulate the data types and likewise, object methods or behaviors can be used to implement the processes described herein.

H. Other Separate Devices

It should be noted that, in some embodiments, some or all of the functions and method steps described herein may be performed partially or entirely by one or more separate devices (not explicitly shown), which are not necessarily retrofitted to a social/retail hotspot 610. Separate devices for use with such an embodiment include, but are not limited to, kiosks and customer devices (PDA devices, laptop computers, and cellular telephones). In some embodiments featuring separate devices, such devices may be capable of communicating, directly (e.g., via Bluetooth® connectivity) or indirectly (e.g., through a web server or IVRU), to a control system in order to facilitate the inventive functionality described herein. In some embodiments featuring separate devices, such separate devices are capable of communicating with a remote computer.

IX. Other Embodiments

According to some embodiments, a social/retail hotspot could include multiple secondary screens, thereby allowing three (3) or more customers to use the social/retail hotspot simultaneously (e.g., one (1) primary screen on the front of a vending machine and a secondary screen on either side of the vending machine (3 screens total)); one (1) primary screen on the front of a kiosk and two (2) secondary screens on either side of the kiosk (5 screens total)). The social/retail hotspot may also or alternatively be in communication with screens and/or other devices that are near, but not physically coupled to the social/retail hotspot (such as one or more large screen monitors and/or TV devices mounted on walls near the social/retail hotspot).

According to some embodiments, a social/retail hotspot may print coupons personalized to a user. For example: printer at device tied to biometric devices in public spaces; issue a series of coupons to a person based on their fingerprint/biometrics; print barcode on coupon that allows a retailer to determine who coupon was issued to; retailer checks ID of redeemer; retailer checks with user's cell phone to make sure user is entitled to coupon; non-transferable coupons, usable only; ad-hoc photo-ID coupons; take picture for coupon with video camera at vending kiosk.

In some embodiments, the social/retail hotspot may be equipped with a printer capable of printing coupons for one or more unique users. The printer may be able to print in color, or with magnetic ink. In one example, the printer may print a secure coupon on water-marked paper. The coupon may include a picture of a person eligible to redeem the coupon.

According to some embodiments, the social/retail hotspot may receive request for a coupon. A social/retail hotspot may receive a request from a user to view one or more coupons available for printing. While waiting for a request, the social/retail hotspot may present the following on a display device, "Press Here to Browse Coupons." A user may indicate his interest in viewing one or more coupons in multiple ways. A user may indicate interest by providing a biometric input—e.g., the user may swipe their thumb on a thumbprint reader. A user may enter a username and/or password using an input device. A user may provide an alternative identification—e.g., the user may swipe their credit card in a card reader. A user may wish to remain anonymous while viewing available coupons—e.g., the user may select an option labeled, "Guest user/Anonymous."

According to some embodiments, the social/retail hotspot may determine a user coupon. Coupons that may be available for printing may be determined based one or more factors. These factors may include: one or more of a user's previously redeemed coupons; information within a user profile (for example, a user's favorite stores, favorite items, residential address, work address); time of day; temperature at the social/retail hotspot (for example, hot cocoa or coffee coupons may be dispensed on a cold day); proximity of stores to social/retail hotspot (for example, only coupons for stores within one thousand feet (1000-ft) of the vending social/retail hotspot may be displayed to the user).

According to some embodiments, the social/retail hotspot may determine consideration from a user. The user may have to provide some form of consideration in exchange for receiving a coupon. Examples of consideration include: sign up for subscription; provide identification/biometric; later sent/shown targeted advertising; promise to perform task; alternately no form of consideration may be necessary.

According to some embodiments, the social/retail hotspot may provide indications of coupons. The vending social/retail hotspot may present to the user one or more coupons that he is eligible to receive. The social/retail hotspot may also communicate to the user an agreement that must be accepted in order for the user to receive the coupon.

According to some embodiments, the social/retail hotspot may receive indication of requested coupon. The vending social/retail hotspot may receive a selection of one or more coupons that the user requests for printing.

According to some embodiments, the social/retail hotspot may receive indication of unique user identifier. The social/retail hotspot may request that the user provide one or more unique identifiers that may be associated with coupon. The unique identifier may provide a minimal amount of information to verify that a user is eligible to redeem a coupon. For example, a coupon may display a picture of a user's face, but not his name, age or address. Examples of unique user identifiers include: a picture of a user's face; a barcode associated with a user or other unique user identifier; a picture of a user's thumbprint that may be compared to a coupon redeemer's thumbprint; a mobile phone number for an eligible user; and a mailing address.

According to some embodiments, the social/retail hotspot may provide coupon to user. A printer at the social/retail hotspot may print a selected coupon for the user. One or more unique user identifiers may also be printed on the coupon. The unique user identifier may allow a business to determine if a coupon redeemer is actually eligible to redeem the coupon.

According to some embodiments, the social/retail hotspot may provide directions using a social/retail hotspot. Receiving a request for directions: user may indicate destination where we would like to go; user may search for particular businesses (e.g., show me a fast food restaurant, a coffee shop, movie theater, etc); "show me a nearby movie theater where movie X is playing"). Providing the directions to the user: social/retail hotspot may have a printer and directions may be provided on a paper printout; customer may view directions on a video screen that is part of the social/retail hotspot; directions may be downloaded into an electronic device that the customer can carry with him (e.g., audio directions downloaded into MP3 player, JPG maps of directions may be downloaded into customer's PDA). Note that electronic device maybe provided by customer (e.g., owned by customer) or dispensed from the social/retail hotspot (e.g., if the social/retail hotspot is a vending machine)

In some embodiments, customers may utilize the hotspot as a coin-collecting repository and/or escrow agent. Two coin-collecting customers may, for example, conduct coin swaps and/or coin purchases by having one of the customers deposit and/or otherwise store a particular coin in the hotspot's inventory, and having the customer authorize (e.g., in exchange for payment—money, other specific coin(s), units of product and/or service at the hotspot) the other customer to have the particular coin dispensed (e.g., upon entering a code, presenting identifying information, and/or depositing a specific coin into the hotspot's inventory).

X. Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition TeleVision (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read. The terms "computer-readable memory" and/or "tangible media" specifically exclude signals, waves, and wave forms or other intangible media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, SAS™ by IGT, OASIS™ by Aristocrat Technologies, SDS by Bally Gaming and Systems, ATP, TCP/IP, GDS published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A vending machine, comprising:
a processor;
a primary customer interface in communication with the processor, the primary customer interface being disposed on a primary side of the vending machine;
a secondary customer interface in communication with the processor, the secondary customer interface being coupled for disposition on a secondary side of the vending machine, wherein the secondary side is different than the primary side;
a sensor in communication with the processor, the sensor coupled to sense the presence of customers situated in front of the primary side of the vending machine; and
a memory in communication with the processor, the memory storing instructions that when executed by the processor result in:
facilitating utilization of the primary customer interface by a first customer, wherein the utilization comprises a first interface session, and wherein the first interface session comprises a display of first interface session data via the primary customer interface;
determining, based on information received from the sensor, that a second customer is in front of the primary side of the vending machine;
determining, in response to the determination that the second customer is in front of the primary side of the vending machine, that the first interface session of the first customer should be switched to the secondary customer interface; and
switching the first interface session of the first customer, in response to the determination that the first interface session should be switched, to the secondary customer interface.

2. The vending machine of claim 1, wherein the switching comprises:
ceasing a transmission of the first interface session data to the primary customer interface and initiating a transmission of the first interface session data to the secondary customer interface.

3. The vending machine of claim 1, wherein the secondary customer interface is coupled for disposition on the secondary side of the vending machine by being moveably coupled to be reoriented from the primary side of the vending machine to the secondary side of the vending machine, and wherein the switching comprises:
causing the secondary customer interface to be reoriented from the primary side of the vending machine to the secondary side of the vending machine.

4. The vending machine of claim 1, wherein the switching comprises:
notifying the first customer that the first interface session of the first customer will be switched to the secondary customer interface on the secondary side of the vending machine.

5. The vending machine of claim 1, wherein the primary customer interface is configured to allow customers to purchase products to be vended by the vending machine and wherein the secondary customer interface is not configured to allow customers to purchase products to be vended by the vending machine.

6. The vending machine of claim 1, wherein the determining that the first interface session of the first customer should be switched to the secondary customer interface comprises:
determining that the first interface session of the first customer should be interrupted.

7. The vending machine of claim 6, wherein the determining that the first interface session of the first customer should be interrupted comprises:
determining that the first interface session of the first customer is likely to generate less revenue than a second interface session likely to be initiated by the second customer.

8. A method, comprising:
facilitating, by a vending machine, utilization of a primary customer interface of the vending machine by a first customer, wherein the primary customer interface is disposed on a primary side of the vending machine and wherein the utilization comprises a first interface session;
determining, by the vending machine and based on information received from a sensor of the vending machine, that a second customer is in front of the primary side of the vending machine;
determining, in response to the determination that the second customer is in front of the primary side of the vending machine, that the first interface session of the first customer should be switched to a secondary customer interface, the secondary customer interface being coupled for disposition on a secondary side of the vending machine, wherein the secondary side is different than the primary side; and
switching the first interface session of the first customer, in response to the determination that the first interface session should be switched, to the secondary customer interface.

* * * * *